Oct. 10, 1967     M. A. L. BRADLEY     3,345,643

DISPOSABLE DRESS SHIELD

Filed March 29, 1965

INVENTOR
Mary A. L. BRADLEY

Featherstonhaugh & Co.
ATTORNEYS

United States Patent Office 3,345,643
Patented Oct. 10, 1967

3,345,643
DISPOSABLE DRESS SHIELD
Mary A. L. Bradley, 7390 Terrebonne Ave.,
Montreal, Quebec, Canada
Filed Mar. 29, 1965, Ser. No. 443,488
5 Claims. (Cl. 2—53)

ABSTRACT OF THE DISCLOSURE

A dress shield having an inner layer of gauze material and an outer layer of heat sealable plastic material, and a filling comprising a multiple of perspiration absorbent layers provided with a plurality of apertures adjacent the peripheral edge thereof. The inner and outer layers being projected beyond the peripheral edge of the absorbent layers and adapted to be sealed together around their peripheral edges and through the apertures in the absorbent layers.

---

This invention relates to improved dress shields adapted to be worn adjacent the underarm portions of dresses for absorption of perspiration and, more particularly, to disposable type dress shields which can be manufactured cheaply and thus disposed of after usage.

Most dress shields at present in use are of the reusable type, being either washable or having replaceable perspiration absorbent inserts, and are thus relatively expensive to produce and to purchase.

The main object of this invention is to produce an improved dress shield which embodies a simplified construction to provide an inexpensive article which can be disposed of after being used only once and which will effectively absorb perspiration whilst providing wearing comfort.

Another object is to provide a disposable type dress shield, as set forth above, which embodies perspiration absorbing layers securely positioned between a body contacting gauze layer and a dress contacting plastic layer. The gauze and plastic layers extend beyond the periphery of the perspiration absorbing layers and are heat sealed together, or otherwise edge seamed, to form an envelope around the perspiration absorbing layers. The gauze and plastic layers are further sealed together, through holes in the perspiration absorbing layers, to securely position the perspiration absorbing layers relative to the gauze and plastic layers.

A further object is to provide a disposable dress shield which embodies transverse creases in the perspiration absorbing layers to provide improved underarm comfort to the wearer.

These and other objects and advantages of this invention will be further apparent by referring to the following detailed specification and figures, in which.

Figure 1:
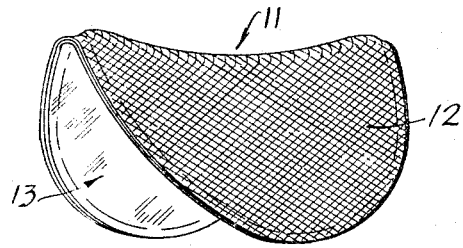
FIG. 1 is a perspective view of a dress shield, in accordance with this invention, and shown in its natural underarm V-shape.
Figure 2:
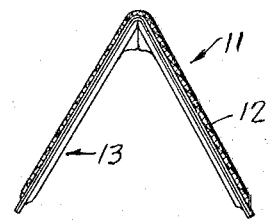
FIG. 2 is an end view of the dress shield shown in FIG. 1.
Figure 4:
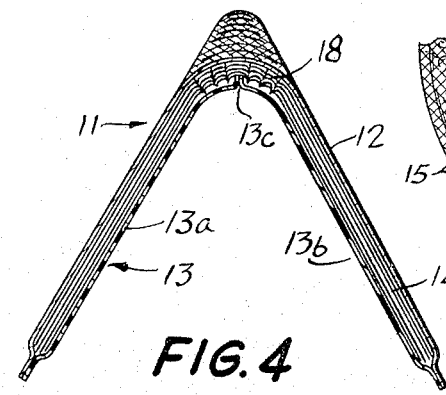
FIG. 4 is a section, to an enlarged scale, taken on 4—4 in FIG. 3.
Figure 3:
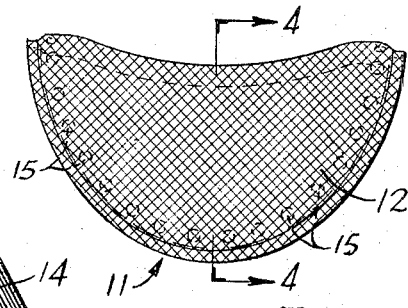
FIG. 3 is a side view of the dress shield shown in FIG. 1.

Referring now to the figures, the dress shield, shown generally at 11, is secured to an underarm portion of a dress by pinning or other conventional fastening means.

Dress shield 11 comprises body contacting inner gauze layer 12, dress contacting outer plastic layer 13, and a plurality of perspiration absorbent layers 14 positioned between inner and outer layers 12 and 13, respectively.

Inner gauze layer 12 comprises one or more layers, as required by strength considerations, of nylon gauze, or a like material which has the characteristics of strength together with the necessary degree of porosity which will enable perspiration to pass therethrough and be absorbed by layers 14. Perspiration absorbent layers 14 comprise approximately four layers of creped, absorbent, cellulosic tissue, or like material having the characteristics of softness, strength, and absorbency. The number of layers 14 required will depend upon the bulk, creping, and absorbency of the tissue. Outer plastic layer 13 is preferably composed of a heat fusible sheet plastic material, such as polyethylene.

Figure 5:
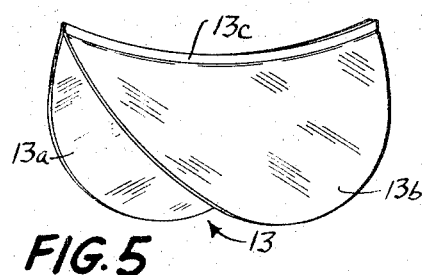
FIG. 5 is a perspective view of the dress contacting complete outer plastic layer.

Outer plastic layer 13 comprises two identical substantially semi-elliptical portions 13a and 13b, as shown in FIG. 5. The mating edges 13c are of generally concave shape and are heat sealed together to form the complete outer layer 13.

Figure 7:
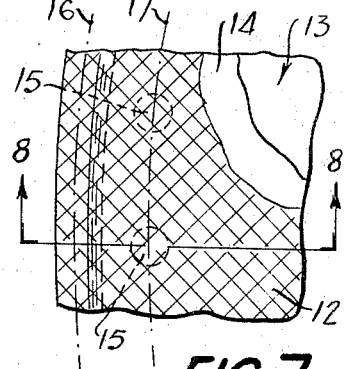
FIG. 7 is an enlarged detail of a peripheral portion of the dress shield.
Figure 8:
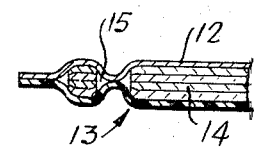
FIG. 8 is a section on 8—8 in FIG. 7.

FIGS. 7 and 8 show enlarged details of a peripheral portion of dress shield 11, this portion being common for all peripheral portions. Inner and outer layers 12 and 13, respectively, extend beyond the outer periphery of perspiration absorbent layers 14 and a plurality of holes 15 are positioned through layers 14 adjacent the periphery thereof.

The preferred method for assembling dress shield 11 is as follows.

The overlapping peripheral edges of layers 12 and 13 are heat sealed together by passing the edges through a first set of heat sealing roller elements to seal approximately along a line shown by broken line 16 in FIG. 7. A second set of heat sealing roller elements are positioned adjacent the first heat sealing rollers and are adapted to seal along a line shown by broken line 17 in FIG. 7, which passes through holes 15. Thus inner and outer layers 12 and 13, respectively, will be additionally sealed through holes 15 and, in so doing, perspiration absorbent layers 14 will be securely located within the envelope formed by layers 12 and 13, and thus perspiration absorbent layers 14 will be prevented from wrinkling, bunching, or being otherwise displaced within layers 12 and 13.

Figure 6:
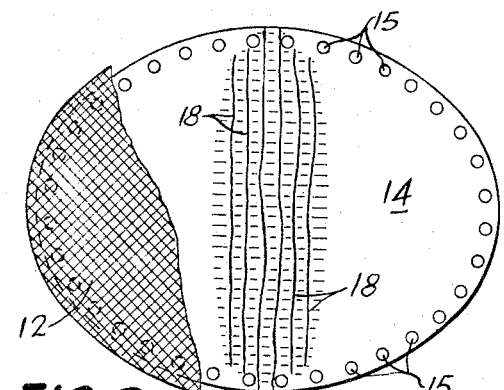
FIG. 6 is a plan view of the perspiration absorbing layers in creased but unfolded condition and includes part of the diagonally biassed inner gauze layer.

FIG. 6 shows a plan view of perspiration absorbent layers 14 embodying creases 18 formed transversely therein, together with a fragment of inner gauze layer 12, before being formed to the V-shape of outer layer 13 and assembled thereto. Creases 18 enable the bulky absorbent layers 14 to follow the concave shape of edges 13c when formed to the V-shape, and thus to provide increased wearer's underarm comfort. It will be obvious that other forms of creases may be equally well embodied in layers 14 and that other heat sealing assembly methods, or edge seaming by stitching, may be used without departing from the spirit of this invention.

Gauze layer 12 is preferably assembled with the weave biased diagonally, as shown in the figures, to facilitate the forming of layer 12 to the compound concave V-shape shown in FIG. 1.

Figure 9:
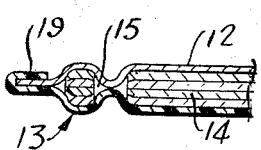
FIG. 9 is a section, similar to FIG. 8, but illustrating an alternative execution of this invention.

FIG. 9 shows a section, similar to FIG. 8, but illustrating an alternative execution in which the peripheral portions of inner plastic layer 13 extend beyond the peripheral portions of gauze layer 12 and are turned inwardly to overlap gauze layer 12, as shown at 19, and the layers are heat sealed together in this position. This execution is used where it is required to manufacture a dress shield embodying more rigid edge portions, or to utilize thicker materials to form a dress shield of improved strength characteristics.

What I claim is:

1. A disposable type dress shield adapted to absorb body perspiration comprising at least one inner layer of gauze like material, an outer layer of heat fusible sheet plastic material, and a plurality of perspiration absorbent layers positioned between said inner and outer layers, the said perspiration absorbent layers having a plurality of apertures located adjacent the peripheral edge thereof, the peripheral portions of said inner and outer layers extending outwardly beyond the peripheral portions of the perspiration absorbent layers and being heat fused together around the peripheral edges of the said perspiration absorbent layers and through the apertures therein to hold the said absorbent layers tautly in position between the inner and outer layers.

2. A dress shield as set forth in claim 1 in which the peripheral portions of said outer layer are turned inwardly and overlap the peripheral portions of said inner layer, said overlapped peripheral portions being heat fused together to form a reinforced peripheral edge.

3. A dress shield as set forth in claim 1 in which the bias of the yarns of said gauze like material is positioned diagonally across said dress shield.

4. A dress shield as set forth in claim 1 in which the said absorbent layers are provided with a plurality of creases positioned transversely to facilitate the shaping of said absorbent layers to the concave shape of said heat sealed edges of the dress shield.

5. A dress shield as set forth in claim 1 in which said gauze like material is nylon, said outer layer material is polyethylene sheet, and said absorbent layers are of creped absorbent cellulosic tissue.

References Cited

UNITED STATES PATENTS

| 1,317,490 | 9/1919 | Graham | 2—53 |
| 2,147,505 | 2/1939 | Spanel | 2—53 |
| 2,556,231 | 6/1951 | Stephens | 2—53 |
| 3,156,924 | 11/1964 | Wonacott | 2—53 |

FOREIGN PATENTS 467,014    3/1914    France.

JORDAN FRANKLIN, *Primary Examiner.*

S. H. HAWKINS, A. R. GUEST, *Assistant Examiners.*